United States Patent
Swaminathan et al.

(10) Patent No.: US 9,584,553 B2
(45) Date of Patent: Feb. 28, 2017

(54) USER EXPERIENCE OF A VOICE CALL ASSOCIATED WITH A DEVICE

(71) Applicant: QUALCOMM Incorporated, San Diego, CA (US)

(72) Inventors: Arvind Swaminathan, San Jose, CA (US); Srinivasan Balasubramanian, San Diego, CA (US); Vamsi Krishna Dokku, San Diego, CA (US); Radhika Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 14/314,847

(22) Filed: Jun. 25, 2014

(65) Prior Publication Data
US 2015/0003342 A1 Jan. 1, 2015

Related U.S. Application Data

(60) Provisional application No. 61/840,733, filed on Jun. 28, 2013.

(51) Int. Cl.
*H04L 29/06* (2006.01)
*H04W 76/02* (2009.01)
(Continued)

(52) U.S. Cl.
CPC ...... *H04L 65/1016* (2013.01); *H04L 65/1069* (2013.01); *H04W 76/027* (2013.01);
(Continued)

(58) Field of Classification Search
CPC .......... H04L 65/1016; H04L 65/1069; H04W 76/027; H04W 88/06
See application file for complete search history.

(56) References Cited

U.S. PATENT DOCUMENTS 8,553,621 B2 10/2013 Wang
2006/0045043 A1* 3/2006 Crocker .............. H04W 76/005
370/328

(Continued)

FOREIGN PATENT DOCUMENTS

WO WO-2013176692 A1 11/2013

OTHER PUBLICATIONS

Partial International Search Report—PCT/US2014/044242—ISA/EPO—Oct. 14, 2014.
(Continued)

*Primary Examiner* — Chi H Pham
*Assistant Examiner* — Weibin Huang
(74) *Attorney, Agent, or Firm* — Patterson & Sheridan, LLP

(57) ABSTRACT

Aspects of the present disclosure provide techniques and apparatus for improving user experience of a voice call associated with a simultaneous voice and long-term evolution (SV-LTE) device (e.g., improving silent redial during a mobile originated (MO) call or mobile terminated (MT) call by a SV-LTE device. A method for wireless communications by a user equipment (UE) capable of communicating via a first packet-based radio access technology (RAT) and a second circuit-switched RAT is provided. The method generally includes detecting initiation of a mobile originated (MO) call, attempting to establish a connection with the first RAT prior to sending a session initiation protocol (SIP) message for the MO call, determining whether the connection is successfully established, and, if the connection is successfully established, sending the SIP message. Numerous other aspects are provided.

28 Claims, 14 Drawing Sheets

(51) Int. Cl.
*H04W 88/06* (2009.01)
*H04W 76/06* (2009.01)

(52) U.S. Cl.
CPC .......... *H04W 88/06* (2013.01); *H04W 76/025* (2013.01); *H04W 76/064* (2013.01)

(56) References Cited

U.S. PATENT DOCUMENTS

| | | | |
|---|---|---|---|
| 2006/0111134 A1* | 5/2006 | Mills ................... | H04W 76/005 455/518 |
| 2007/0201441 A1* | 8/2007 | Buckley ................ | H04W 80/10 370/356 |
| 2010/0329244 A1 | 12/2010 | Buckley et al. | |
| 2012/0039167 A1* | 2/2012 | Swaminathan ..... | H04W 76/026 370/225 |
| 2012/0142341 A1 | 6/2012 | Nagpal et al. | |
| 2012/0236709 A1 | 9/2012 | Ramachandran et al. | |
| 2013/0023265 A1 | 1/2013 | Swaminathan et al. | |
| 2013/0336308 A1 | 12/2013 | Laasik et al. | |

OTHER PUBLICATIONS

International Search Report and Written Opinion—PCT/US2014/044242—ISA/EPO—Jan. 22, 2015.

\* cited by examiner

USER EXPERIENCE OF A VOICE CALL ASSOCIATED WITH A DEVICE

CROSS-REFERENCE TO RELATED APPLICATION(S)

This application claims benefit of U.S. Provisional Patent Application Ser. No. 61/840,733, filed Jun. 28, 2013, which is herein incorporated by reference in its entirety.

BACKGROUND

I. Field of the Disclosure

Aspects of the present disclosure relate generally to wireless communications, and more particularly, to techniques and apparatus for improving user experience of a voice call associated with a device, such as a simultaneous voice and long-term evolution (SV-LTE) device, for example by improving silent redial during a mobile originated (MO) call or mobile terminated (MT) call by a SV-LTE device.

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

However, as the demand for mobile broadband access continues to increase, there exists a need for further improvements in LTE technology. Preferably, these improvements should be applicable to other multi-access technologies and the telecommunication standards that employ these technologies.

SUMMARY

Techniques and apparatus are provided herein for improving user experience of a voice call associated with a device, such as a simultaneous voice and long-term evolution (SV-LTE) device, for example by improving silent redial during a mobile originated (MO) call or mobile terminated (MT) call by a SV-LTE device.

Certain aspects of the present disclosure provide a method for wireless communications by a user equipment (UE) capable of communicating via a first packet-based radio access technology (RAT) and a second circuit-switched RAT. The method generally includes detecting initiation of a MO call, attempting to establish a connection with the first RAT prior to sending a session initiation protocol (SIP) message for the MO call, determining whether the connection is successfully established, and, if the connection is successfully established, sending the SIP message.

Certain aspects of the present disclosure provide a method for wireless communications by a UE capable of communicating via a first packet-based RAT and a second circuit-switched RAT. The method generally includes receiving, over a packet-based RAT, an incoming MO call, having a first origination number and a first destination number, receiving, over a circuit-switched RAT, an incoming MO call, having a second origination number and a second destination number, determining whether the first and second origination numbers and the first and second destination numbers are same, and, if so, determining whether to forward, drop, or terminate at least one of the MO call received over the packet-based RAT or the MO call received over the circuit-switched RAT.

Certain aspects of the present disclosure provide an apparatus for wireless communications. The apparatus generally includes means for detecting initiation of a MO call, means for attempting to establish a connection with the first RAT prior to sending a SIP message for the MO call, means for determining whether the connection is successfully established, and, means for, if the connection is successfully established, sending the SIP message.

Certain aspects of the present disclosure provide an apparatus for wireless communications. The apparatus generally includes means for receiving, over a packet-based RAT, an incoming MO call, having a first origination number and a first destination number, means for receiving, over a circuit-switched RAT, an incoming MO call, having a second origination number and a second destination number, means for determining whether the first and second origination numbers and the first and second destination numbers are same, and, means for, if the first and second origination numbers and the first and second destination numbers are the same, determining whether to forward, drop, or terminate at least one of the MO call received over the packet-based RAT or the MO call received over the circuit-switched RAT.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
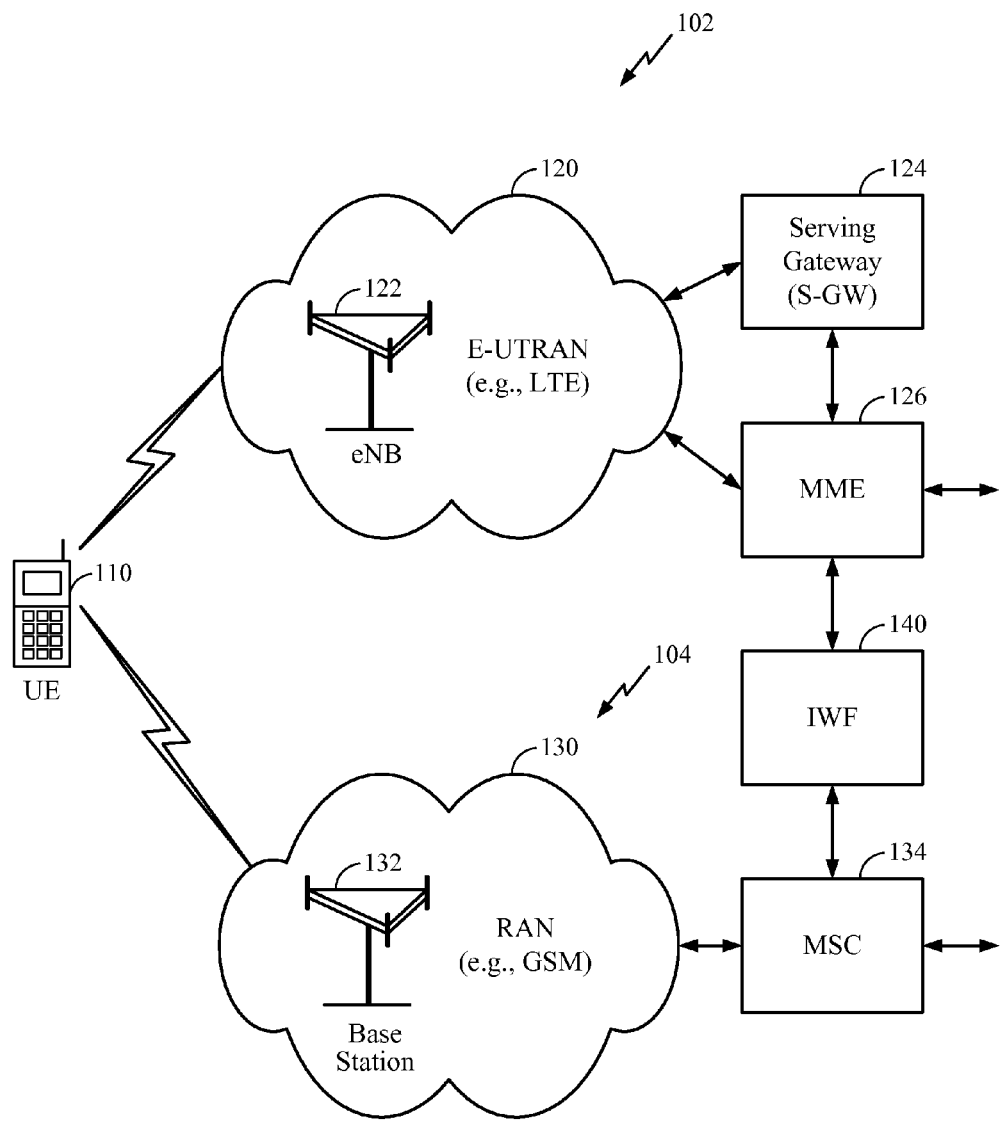
FIG. 1 illustrates an exemplary deployment in which multiple wireless networks have overlapping coverage, in accordance with certain aspects of the present disclosure.

Techniques and apparatus are provided herein for improving user experience of a voice call associated with a device, such as a simultaneous voice and long-term evolution (SV-LTE) device, (e.g., improving silent redial during a mobile originated (MO) call or mobile terminated (MT) call by a SV-LTE device. According to certain aspects, MO user equipment (UE)-based, network-based, and MT UE-based solutions are provided. A UE may require a radio resource control (RRC) connection to be established with the network before queuing a SIP:INVITE message. This may avoid the LTE call going through to the far-end after a 1× redial may have been performed if an error is encountered while establishing the RRC connection. According to certain aspects, a network or far-end UE server may recognize when two calls are initiated between the same two UEs and may determine to drop the first or the second call, or buffer the second for a time to determine whether the first call remains active. This may help improve user experience.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1× radio transmission technology (1×RTT), CDMA2000 1×, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques and apparatus described herein may be used for the wireless networks and RATs mentioned above as well as other wireless networks and RATs.

Circuit-switched fallback (CSFB) is a technique to deliver voice-services to a UE, when the UE is camped in a long-term evolution (LTE) network. This may be required when the LTE network does not support voice services natively. The LTE network and a 3GPP CS network (e.g., UMTS or GSM) may be connected using a tunnel interface. The UE may register with the 3GPP CS network while on the LTE network by exchanging messages with the 3GPP CS core network over the tunnel interface.

An Example Wireless Communications System

FIG. 1 shows an exemplary deployment in which multiple wireless networks have overlapping coverage. An evolved universal terrestrial radio access network (E-UTRAN) 120 may support LTE and may include a number of evolved Node Bs (eNBs) 122 and other network entities that can support wireless communication for user equipments 110 (UEs). Each eNB 122 may provide communication coverage for a particular geographic area. The term "cell" can refer to a coverage area of an eNB and/or an eNB subsystem serving this coverage area. A serving gateway (S-GW) 124 may communicate with E-UTRAN 120 and may perform various functions such as packet routing and forwarding, mobility anchoring, packet buffering, initiation of network-triggered services, etc. A mobility management entity (MME) 126 may communicate with E-UTRAN 120 and serving gateway 124 and may perform various functions such as mobility management, bearer management, distribution of paging messages, security control, authentication, gateway selection, etc. The network entities in LTE are described in 3GPP TS 36.300, entitled "Evolved Universal Terrestrial Radio Access (E-UTRA) and Evolved Universal Terrestrial Radio Access Network (E-UTRAN); Overall description," which is publicly available.

A radio access network (RAN) 130 may support GSM and may include a number of base stations 132 and other network entities that can support wireless communication for UEs. A mobile switching center (MSC) 134 may communicate with the RAN 130 and may support voice services, provide routing for circuit-switched calls, and perform mobility management for UEs located within the area served by MSC 134. Optionally, an inter-working function (IWF) 140 may facilitate communication between MME 126 and MSC 134 (e.g., for 1xCSFB).

E-UTRAN 120, serving gateway 124, and MME 126 may be part of an LTE network 102. RAN 130 and MSC 134 may be part of a GSM network 104. For simplicity, FIG. 1 shows only some network entities in the LTE network 102 and the GSM network 104. The LTE and GSM networks may also include other network entities that may support various functions and services.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs.

A UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Upon power up, UE 110 may search for wireless networks from which it can receive communication services. If more than one wireless network is detected, then a wireless network with the highest priority may be selected to serve UE 110 and may be referred to as the serving network. UE 110 may perform registration with the serving network, if necessary. UE 110 may then operate in a connected mode to actively communicate with the serving network. Alternatively, UE 110 may operate in an idle mode and camp on the serving network if active communication is not required by UE 110.

UE 110 may be located within the coverage of cells of multiple frequencies and/or multiple RATs while in the idle mode. For LTE, UE 110 may select a frequency and a RAT to camp on based on a priority list. This priority list may include a set of frequencies, a RAT associated with each frequency, and a priority of each frequency. For example, the priority list may include three frequencies X, Y and Z. Frequency X may be used for LTE and may have the highest priority, frequency Y may be used for GSM and may have the lowest priority, and frequency Z may also be used for GSM and may have medium priority. In general, the priority list may include any number of frequencies for any set of RATs and may be specific for the UE location. UE 110 may be configured to prefer LTE, when available, by defining the priority list with LTE frequencies at the highest priority and with frequencies for other RATs at lower priorities, e.g., as given by the example above.

UE 110 may operate in the idle mode as follows. UE 110 may identify all frequencies/RATs on which it is able to find a "suitable" cell in a normal scenario or an "acceptable" cell in an emergency scenario, where "suitable" and "acceptable" are specified in the LTE standards. UE 110 may then camp on the frequency/RAT with the highest priority among all identified frequencies/RATs. UE 110 may remain camped on this frequency/RAT until either (i) the frequency/RAT is no longer available at a predetermined threshold or (ii) another frequency/RAT with a higher priority reaches this threshold. This operating behavior for UE 110 in the idle mode is described in 3GPP TS 36.304, entitled "Evolved Universal Terrestrial Radio Access (E-UTRA); User Equipment (UE) procedures in idle mode," which is publicly available.

UE 110 may be able to receive packet-switched (PS) data services from LTE network 102 and may camp on the LTE network while in the idle mode. LTE network 102 may have limited or no support for voice-over-Internet protocol (VoIP), which may often be the case for early deployments of LTE networks. Due to the limited VoIP support, UE 110 may be transferred to another wireless network of another RAT for voice calls. This transfer may be referred to as circuit-switched (CS) fallback. UE 110 may be transferred to a RAT that can support voice service such as 1xRTT, WCDMA, GSM, etc. For call origination with CS fallback, UE 110 may initially become connected to a wireless network of a source RAT (e.g., LTE) that may not support voice service. The UE may originate a voice call with this wireless network and may be transferred through higher-layer signaling to another wireless network of a target RAT that can support the voice call. The higher-layer signaling to transfer the UE to the target RAT may be for various procedures, e.g., connection release with redirection, PS handover, etc.

As described in greater detail below, in some embodiments, the Node Bs may implement the functionality described herein for improving user experience of a voice call associated with a device, such as simultaneous voice and long-term evolution (SV-LTE) device, (e.g., improving silent redial in mobile originated calls). For example, a Node B may detect failures during mobile originated calls from a UE and may redirect the UE to another system in an effort to speed up a silent redial procedure.

As described in greater detail below, in some embodiments, the UEs 110 may implement the functionality described herein for improving user experience of a voice call associated with a device, such as a simultaneous voice and long-term evolution (SV-LTE) device, (e.g., improving silent redial in mobile originated calls). For example, the UE may maintain timers, counts, and/or thresholds for use in silent redial. UE 110 may also detect a failure during mobile originated call, determine how to attempt retrying the call, select a subsequent system for attempting the call, and attempt to retry the call as described herein.

Figure 2:
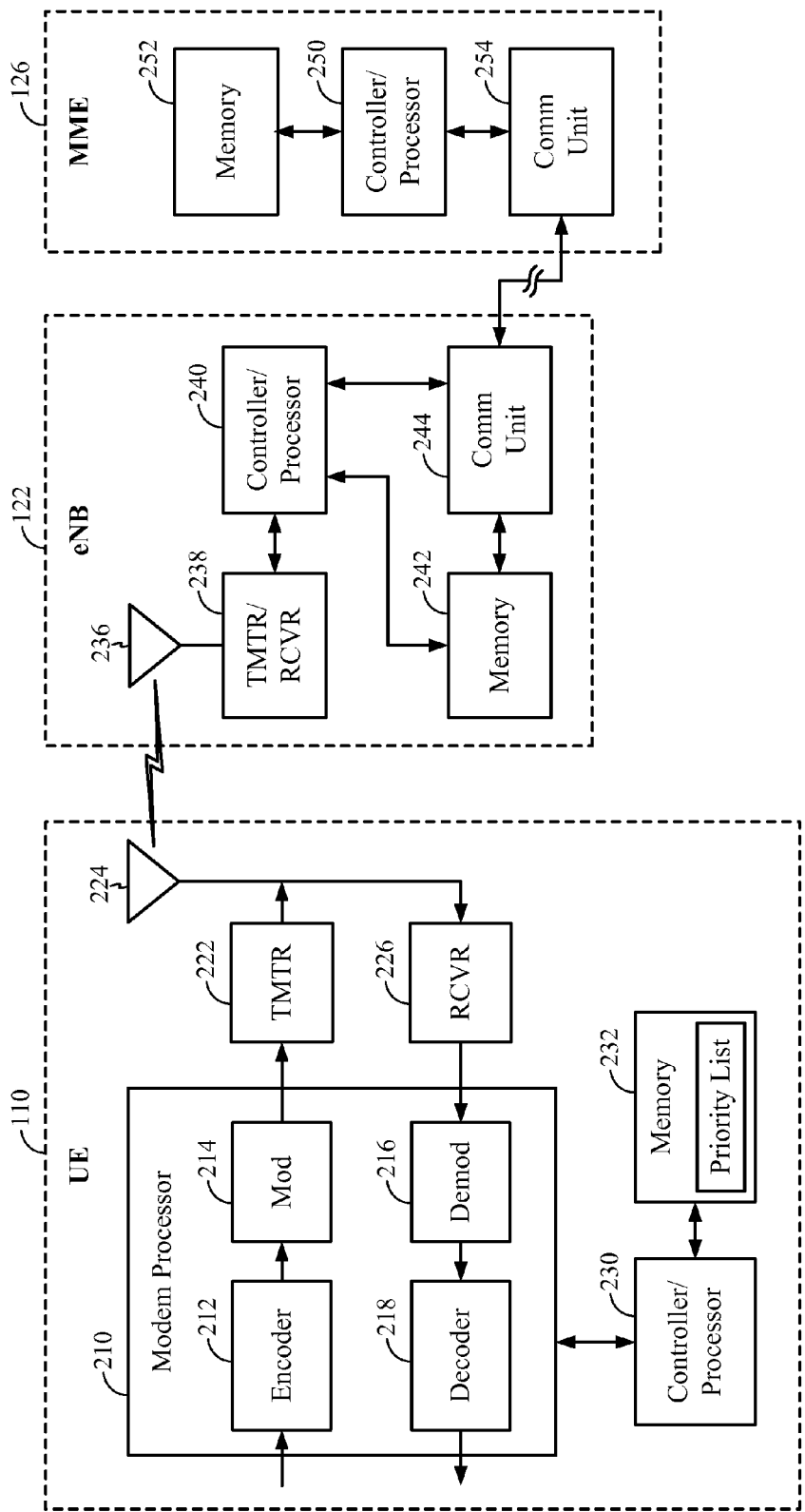
FIG. 2 shows a block diagram conceptually illustrating an example of a base station in communication with a user equipment (UE) in a wireless communications network, in accordance with certain aspects of the present disclosure.

FIG. 2 shows simplified block diagrams of UE 110, eNB 122, and MME 126 of FIG. 1. In general, each entity may include any number of transmitters, receivers, processors, controllers, memories, communication units, etc. Other network entities may also be implemented in similar manner.

At UE 110, an encoder 212 may receive traffic data and signaling messages to be sent on the uplink. Encoder 212 may process (e.g., format, encode, and interleave) the traffic data and signaling messages. A modulator (Mod) 214 may further process (e.g., symbol map and modulate) the encoded traffic data and signaling messages and provide output samples. A transmitter (TMTR) 222 may condition (e.g., convert to analog, filter, amplify, and frequency upconvert) the output samples and generate an uplink signal, which may be transmitted via an antenna 224 to eNB 122.

On the downlink, antenna 224 may receive downlink signals transmitted by eNB 122 and/or other eNBs/base stations. A receiver (RCVR) 226 may condition (e.g., filter, amplify, frequency downconvert, and digitize) the received signal from antenna 224 and provide input samples. A demodulator (Demod) 216 may process (e.g., demodulate) the input samples and provide symbol estimates. A decoder 218 may process (e.g., deinterleave and decode) the symbol estimates and provide decoded data and signaling messages sent to UE 110. Encoder 212, modulator 214, demodulator 216, and decoder 218 may be implemented by a modem processor 210. These units may perform processing in accordance with the RAT (e.g., LTE, 1×RTT, etc.) used by the wireless network with which UE 110 is in communication.

A controller/processor 230 may direct the operation at UE 110. Controller/processor 230 may also perform or direct other processes for the techniques described herein. Controller/processor 230 may also perform or direct the processing by UE. Memory 232 may store program codes and data for UE 110. Memory 232 may also store a priority list and configuration information.

At eNB 122, a transmitter/receiver (TMTR/RCVR) 238 may support radio communication with UE 110 and other UEs. A controller/processor 240 may perform various functions for communication with the UEs. On the uplink, the uplink signal from UE 110 may be received via an antenna 236, conditioned by receiver 238, and further processed by controller/processor 240 to recover the traffic data and signaling messages sent by UE 110. On the downlink, traffic data and signaling messages may be processed by controller/processor 240 and conditioned by transmitter 238 to generate a downlink signal, which may be transmitted via antenna 236 to UE 110 and other UEs. Controller/processor 240 may also perform or direct other processes for the techniques described herein. Controller/processor 240 may also perform or direct the processing by eNB 122. Memory 242 may store program codes and data for the base station. A communication (Comm) unit 244 may support communication with MME 126 and/or other network entities.

At MME 126, a controller/processor 250 may perform various functions to support communication services for UEs. Controller/processor 250 may also perform or direct the processing by MME 126 in FIGS. 3 and 4. Memory 252 may store program codes and data for MME 126. A communication unit 254 may support communication with other network entities.

Example Circuit-Switched Fallback

Figure 3:
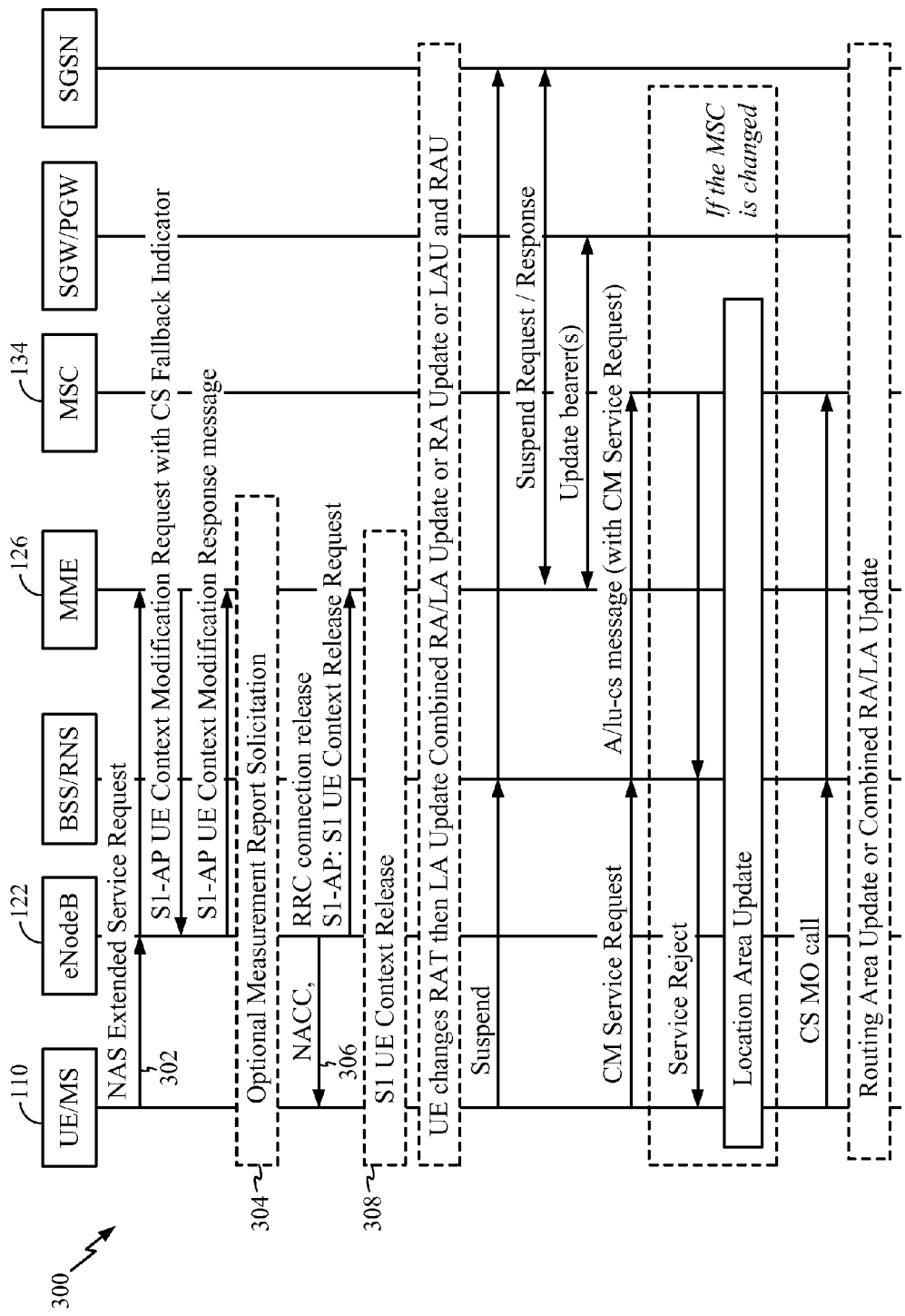
FIG. 3 illustrates an example call flow for a mobile originated (MO) call, in accordance with certain aspects of the present disclosure.

FIG. 3 illustrates an example call flow 300 for circuit-switched (CSFB) when a UE (e.g., UE 110), which may support EUTRAN/UTRAN/GERAN protocols, makes a mobile-originated (MO) call, in accordance with certain aspects of the present disclosure. While the UE 110 is camped on a long-term evolution (LTE) network 102 that may not support voice services, the UE 110 may fall back to a 1× network connected to the mobile switching center (MSC) 134 in order to make the MO call. As shown, the call setup procedure may begin at 302 where the UE 110 may initiate a non access stratum (NAS) extended service request (ESR). At 304, the UE may receive CS radio access technology (RAT) candidates from a measurement report. At 306, the LTE network 102 may assist the UE 110 in the mobility procedure in a network assisted cell change (NACC). For example, if an interface between the MSC 134 and the mobility management entity (MME) 126 is down, the LTE network 102 may inform the UE 110 to retry the call setup after a set period. At 308, the UE may receive a mobility command from the LTE network 102 indicating the target RAT/band/channel the UE 110 may need to tune to in order to find CS services and in order to continue with the call setup procedure.

Figure 4:
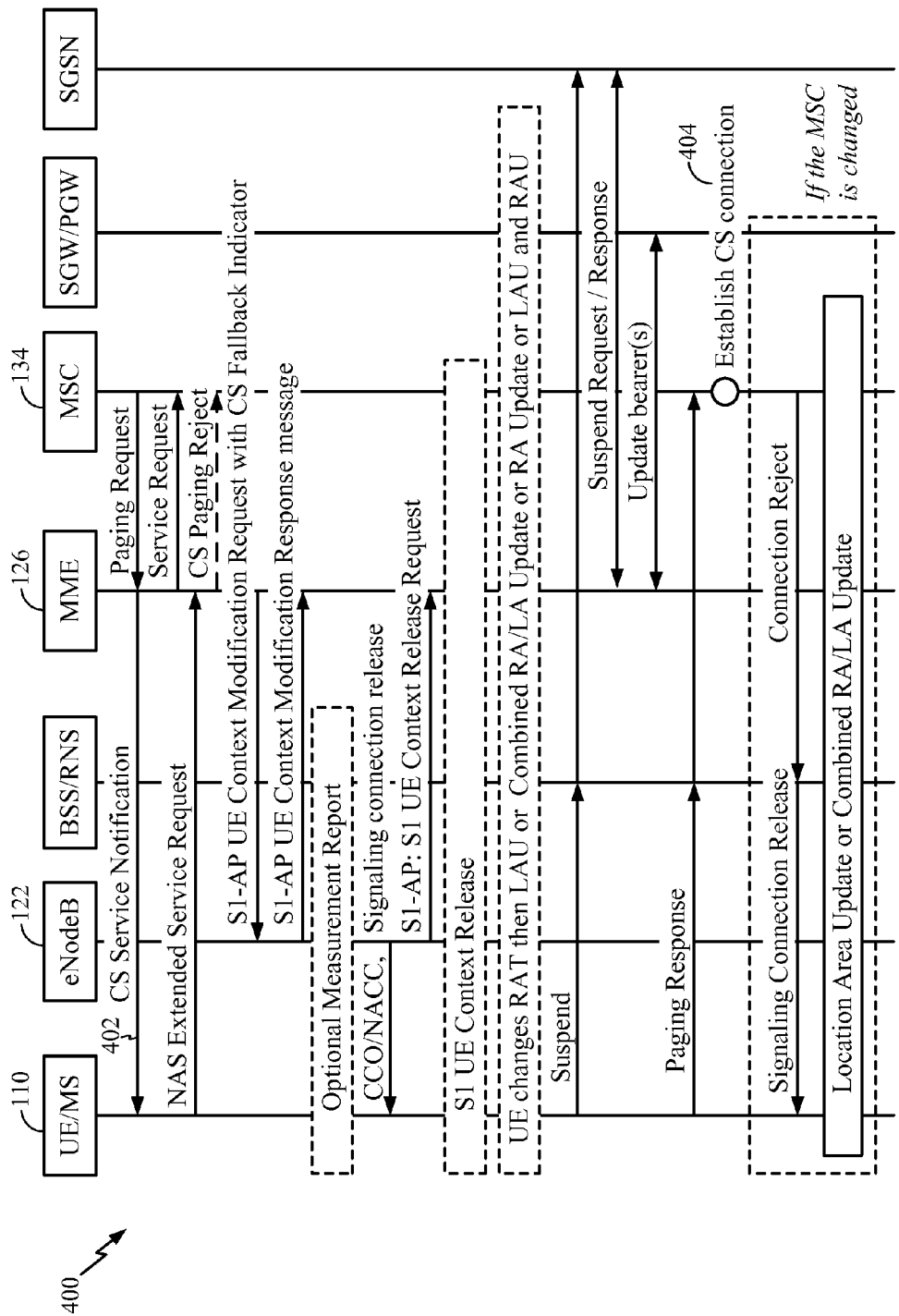
FIG. 4 illustrates an example call flow for a mobile terminated (MT) call, in accordance with certain aspects of the present disclosure

FIG. 4 illustrates an example call flow 400 of CSFB when a UE 110 receives a mobile-terminated (MT) call, according to certain aspects of the present disclosure. Operations may be similar to those described in FIG. 3, however, the UE 110 may initiate the call setup procedure after receiving a 1× page at 402 (CS SERVICE NOTIFICATION). The MSC 134 may deliver the 1× page to the UE 110 (e.g., forward the page through SGs interface to MME 126). The 1× page may comprise caller line identification information.

Silent Redial

Various failures may occur when a voice over IP (e.g., voice over LTE (VoLTE)) enabled user equipment (UE) places a mobile originated (MO) call. Silent redial refers to the autonomous redialing of a call by a UE without user intervention when failures occur. Silent redial may improve a user's experience, for example, by hiding recoverable failures from the user.

A failure that occurs during a MO call in a current system may be detected and an attempt to retry the call may be determined based, at least in part, on a restriction status of the call. For example, a UE may select a subsequent system for attempting the call based, in part, on a feature of the detected failure and whether or not the MO call is restricted to a particular radio access technology (RAT).

Each failure during a MO call may be classified into three categories: soft failures, hard failures, or no retry failures. As described below, a UE may select a subsequent system for attempting the call and attempt to retry the call based, in part, on the detected failure. Soft failures occur when there is a sufficiently high probability of success if the call is re-originated over the current LTE system. Thus, in the case of a soft failure, it may be preferable to retry the MO call over the current LTE system, since acquiring another system to place the call may result in a long call setup delay. Hard failures occur when call origination may not be performed for a long time over the current LTE system or when the probability of success of placing the MO call over the current LTE system is low. Accordingly, in the case of a hard failure, it may be preferable to retry the MO call over another system.

No retry failures occur when re-originating the call may not result in success of the MO call. No retry failures may also occur when the MO call is restricted to LTE and the failure is such that a call attempt may not be retried over LTE. If acquisition failures (e.g., hard failures) occur on all of the LTE neighbor frequencies, or if no LTE inter-frequency neighbors exist, the UE may attempt acquisition on circuit-switched (CS) RATs (e.g., 1×, GSM, WCDMA).

Aspects of the present disclosure provide a framework for improving silent redial during a MO VoLTE call.

Improving User Experience of a Voice Call Associated with a Device

As illustrated in FIG. 1, certain devices, for example, simultaneous voice long-term evolution (SV-LTE) devices (i.e., a user equipment (UE) in SV-LTE mode), may be camped on multiple random access networks (RAN). For example, the UE 110 may be camped in a circuit-switched network (e.g., 3G, Global System for Mobile (GSM), code division multiple access (CDMA) 1×, wireless CDMA (WCDMA), or time division synchronous CDMA (TD-SCDMA)) and a packet-switched network (e.g., LTE). In one example, UE 110 may be camped on both 1× and LTE, and the UE 110 may be using voice over LTE (VoLTE) for voice service.

Figure 5:
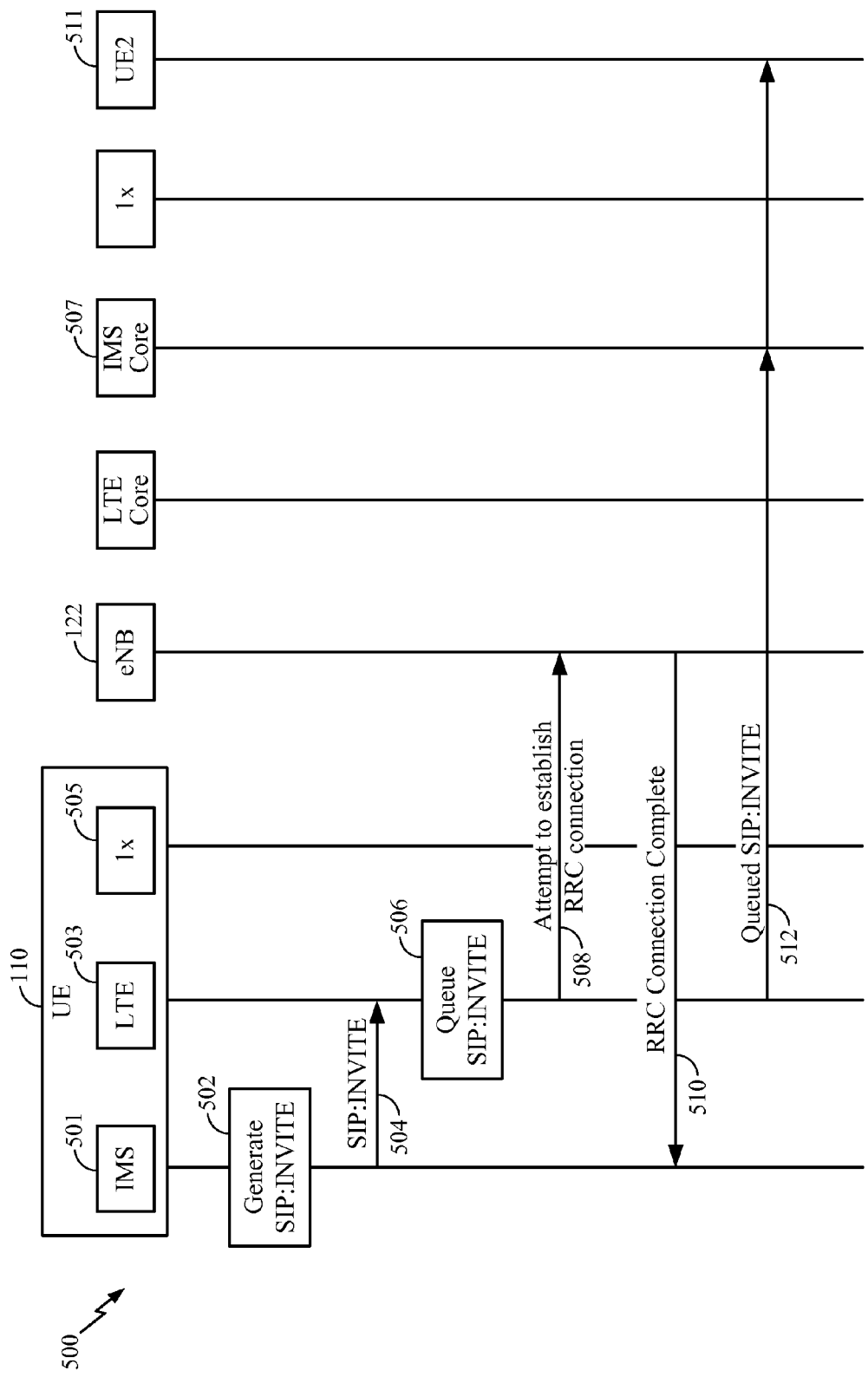
FIG. 5 illustrates example call flow for placing a voice over long term evolution (VoLTE) MO call.

FIG. 5 illustrates an example call flow 500 for a VoLTE mobile originated (MO) call. As shown in FIG. 5, at 502, UE 110 may create an internet protocol (IP) packet having a session initiation protocol (SIP) message header, SIP:INVITE. The SIP:INVITE may specify an action that the requesting UE 110 (e.g., the calling party) wants the server UE (e.g., the called party) to take, in this case the sever UE may be far-end user 511. The SIP:INVITE request may include a number of header fields. Header fields are named attributes that may provide additional information about a message. SIP:INVITE header fields may include a unique identifier number for the call, the destination address number, calling party address number, and information about the type of session that the requester wishes to establish with the server. At 504, the SIP:INVITE may be sent from higher layer IP multimedia subsystem (IMS) client 501 to the lower layer LTE stack 503, where, at 506, the SIP:INVITE may be queued. IMS is a SIP-based protocol architecture. The LTE stack 503 may see the queued packet in the idle state and, at 508, to initiate the MO VoLTE call to a far end user 511 (e.g., a UE), attempt to establish a LTE remote radio control (RRC) connection with the network (e.g., at eNB 122). Once the connection is established (at 510), the UE 110 may, at 512, send the packet including the SIP:INVITE to the far-end user 511, via the IMS core network, to inform the far-end user 511 of the incoming call. The far-end user 511 may respond. And after the response, both sides may begin exchanging media packets on a different port.

Figure 6:
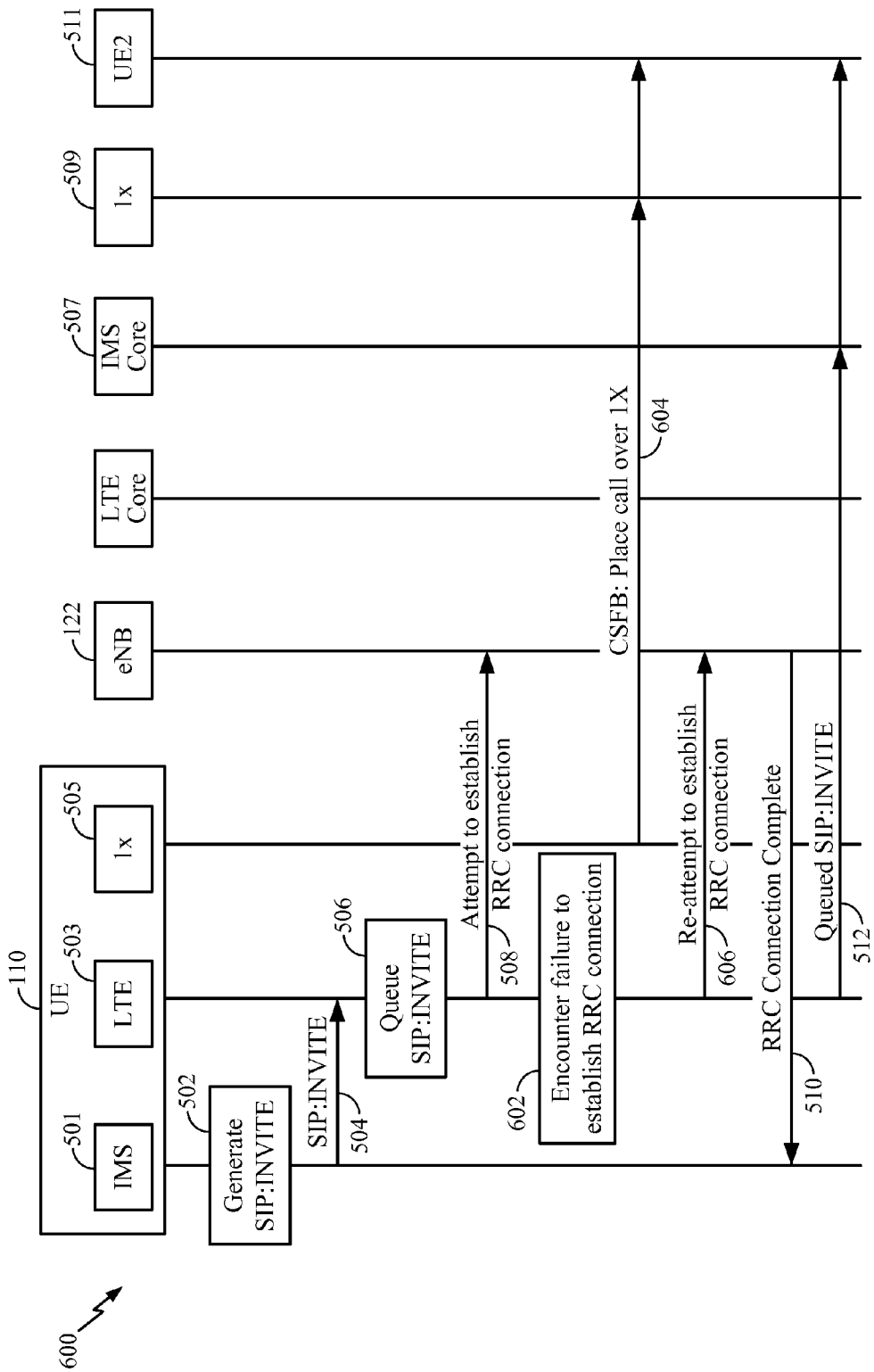
FIG. 6 illustrates example call flow for placing a call on 1× and LTE between the same users.

However, as shown in the call flow 600 in FIG. 6, after the UE 110 attempts, at 508, to establish an RRC connection with the eNB 122, at 602, the UE 110 may encounter a failure to establish the RRC connection (e.g., due to a failure in the lower layer). For example, an error may be detected if a response is not received from the network over a duration of time. According to certain aspects, a timer may be started, at 506, when the SIP:INVITE is queued and the timer may expire before receiving a RRC connection complete message from the eNB 122. In this case, the SIP:INVITE may remain queued at LTE stack 503 (e.g., in a buffer) of the UE 110. Because the UE is SV-LTE capable, at 604, the UE may retry the voice call over 1× network 509 by silent redial. The far-end user 511 may not be a SV-LTE device.

However, as shown in FIG. 6 at 606, the UE LTE stack 503 may continue to attempt to establish the RRC connection even after performing the silent redial over 1× network 509. Once the RRC is successfully established at 510, the queued SIP:INVITE will be sent out at 512. This may occur after the UE 110 has established the call to far-end user 511 over 1× network 509. In this case, the far-end user 511 receives a first call from the UE 110 over 1× network 509 and subsequently receives a second call (e.g., call waiting call) from the same UE 110 over LTE. This may lead to poor user experience.

Accordingly, techniques and apparatus for improving silent redial for SV-LTE devices are desirable.

Techniques and apparatus are provided herein for improving user experience of a voice call associated with a simultaneous voice and packet-based network device (e.g., improving silent redial during a MO/MT call by a SV-LTE device). According to certain aspects, MO UE-based, network-based, and MT UE-based solutions are provided. According to certain aspects, for a MO UE-based solution, a UE may queue a SIP:INVITE message only after a RRC connections is established with the network. This may avoid the LTE call going through to the far-end after a 1× redial may have been performed due to the UE encounter a failure while establishing the RRC connection. According to certain aspects, for a network or MT UE-based solution, a network or far-end UE server may recognize when two calls are initiated between the same two UEs and may determine to drop the first or the second call, or buffer the second for a time to determine whether the first call remains active. This may help improve user experience.

Mobile Originated (MO) UE-Based Solution

Figure 7:
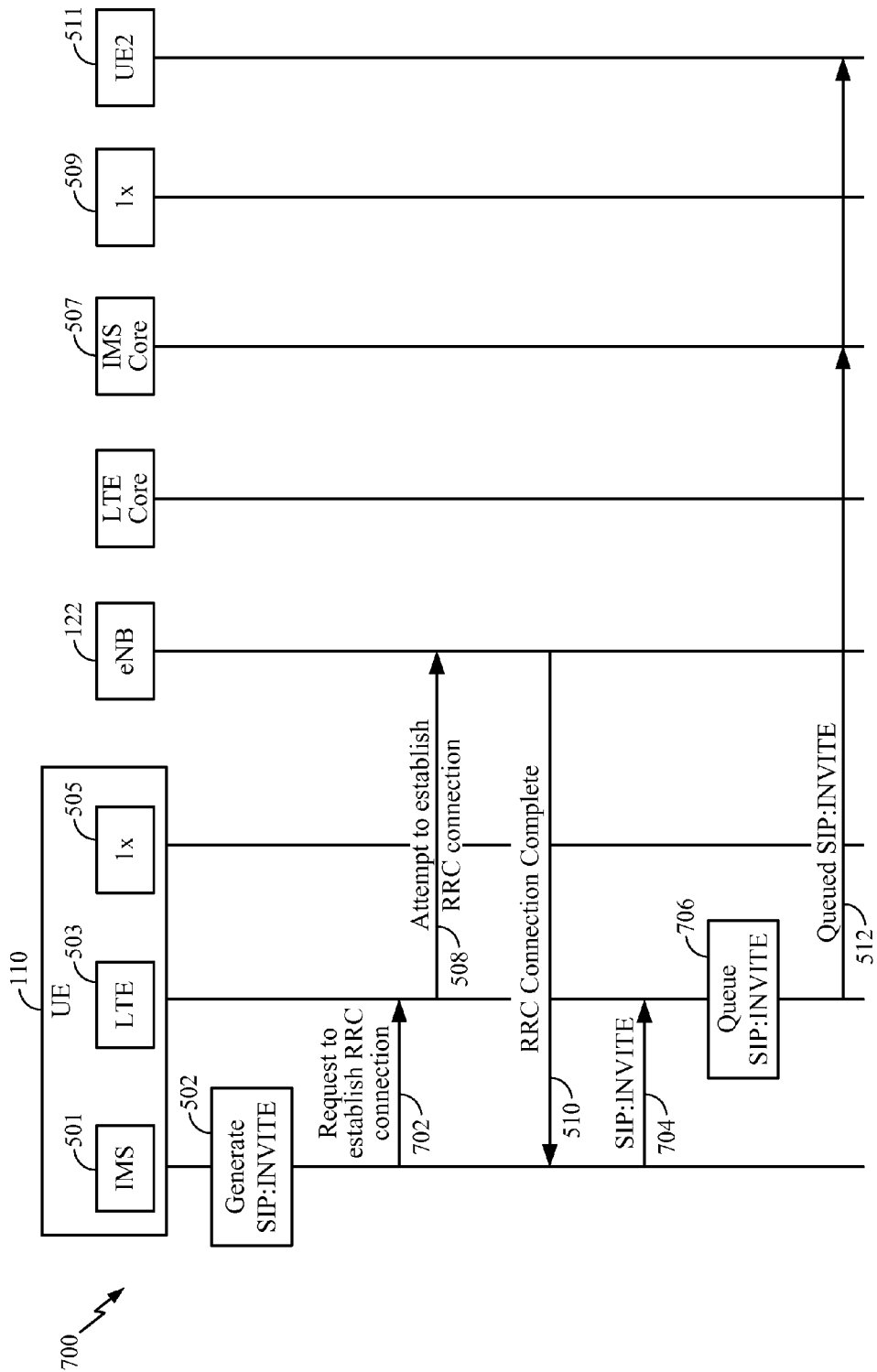
FIG. 7 illustrates an example call flow for a VoLTE MO call, in accordance with certain aspects of the present disclosure.

According to certain aspects, a mobile originated (MO) user equipment (UE)-based solution may be used. FIG. 7 illustrates an example call flow 700 for a voice over long term evolution (VoLTE) MO call, in accordance with certain aspects of the present disclosure. As shown in FIG. 7 at 502, the UE 110 may generate the SIP:INVITE. However, before queuing an IP packet having SIP:INVITE, the UE may first inform the lower layer that it has a packet to send, and instruct the lower layer to establish an RRC connection. Therefore, if a failure occurs in establishing the RRC connection, the SIP:INVITE will not be sent. For example, at 702, the IMS client 501 may first request the LTE stack 503 to bring up the RRC connection. The UE 110 may then wait until the connection is established before sending before sending SIP:INVITE. For example, at 508, the LTE stack 503 may attempt to establish a RRC connection with eNB 122 and, at 510, the connection may be completed and the IMS client 501 may receive a RRC Connection Complete message from the eNB 122. According to certain aspects, only after receiving confirmation that the RRC connection is completed, the UE 110 may, at 704, send the packet including the SIP:INVITE to the LTE stack 503 where, at 706, the SIP:INVITE may be queued and then sent to the far-end user 511 to inform the far-end user 511 of the incoming VoLTE call. Thus, because the UE 110 waits until the RRC connection is completed before sending the SIP:INVITE, the UE 110 may avoid placing more than one call (e.g., over LTE and over 1×) to the same far-end user 511 if there is a failure in establishing the RRC connection. Instead, the UE may perform a silent redial on 1× and a spurious call will not be made, because the SIP:INVITE packet was never queued, as illustrating in FIG. 8, for example.

Figure 8:
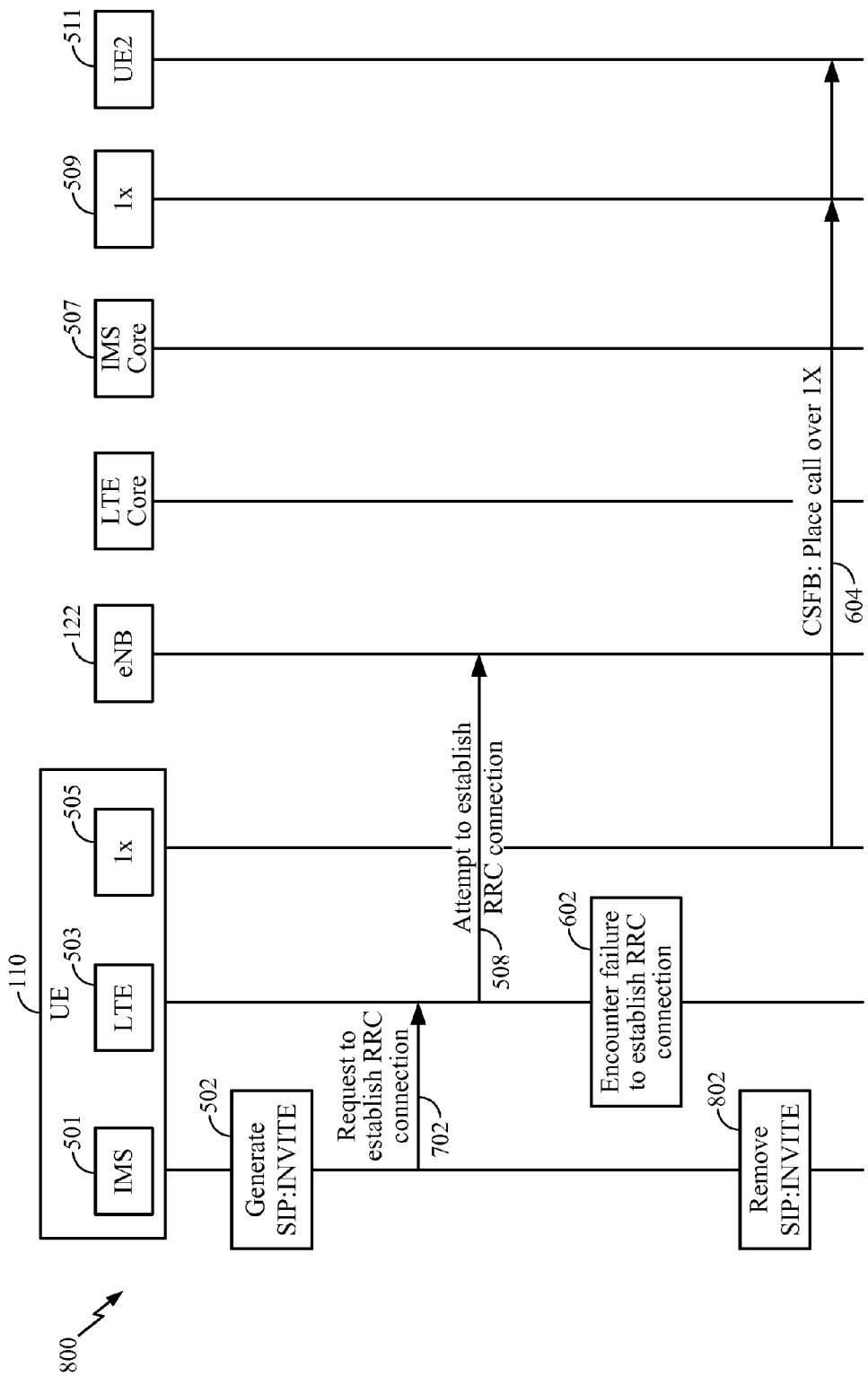
FIG. 8 illustrates an example call flow for placing a call on 1× after attempting the same call on LTE, in accordance with certain aspects of the present disclosure.

FIG. 8 illustrates an example call flow 800 for placing a call on 1× after attempting the same call on LTE, in accordance with certain aspects of the present disclosure. As shown in FIG. 8, generating a SIP:INVITE, at 502, and requesting, at 702, the LTE stack 503 to attempt to establish a RRC connection, the UE 110 may encounter at failure to establish the RRC connection, at 602. According to certain aspects, when the UE 110 decides to perform silent redial, it may instruct the IMS client 501 to delete the call state. For example, because the SIP:INVITE was not sent to the lower layer LTE stack 503, at 802, by causing the IMS client 501 to delete the SIP:INVITE message. Thus, at 604, the UE 110 can place a call over 1× to the far-end user 511 and the LTE call will not be made, therefore, the far-end user 511 does not receive a call-waiting call from the same UE 110. This may improve user experience.

Figure 9:
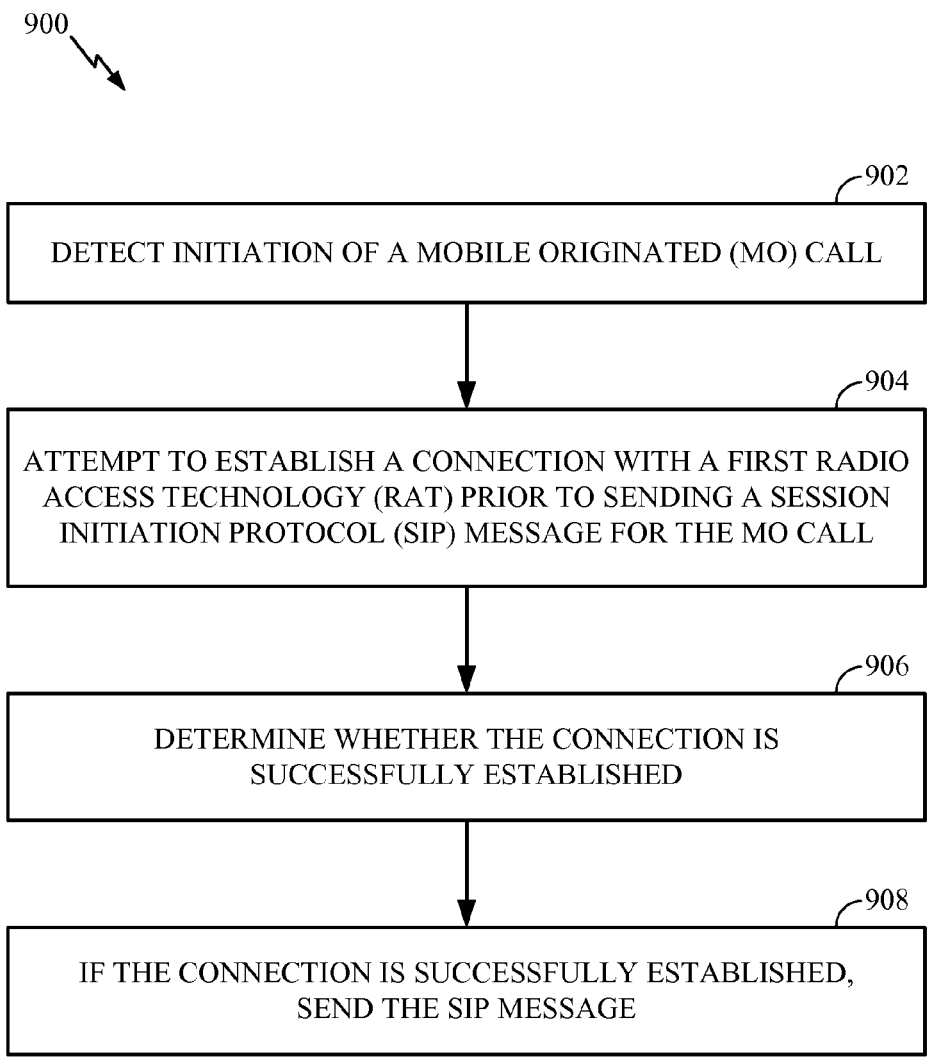
FIG. 9 illustrates example operations for wireless communications by a UE capable of communicating via a first packet-based radio access technology (RAT) and a second circuit-switched RAT, in accordance with certain aspects of the present disclosure.

FIG. 9 illustrates example operations 900 for wireless communications, according to aspects of the present disclosure. The operations 900 may be performed, for example, by a UE (e.g., UE 110) capable of communicating via a first packet-based RAT (e.g., LTE) and a second circuit-switched RAT (e.g., 1×). The operations may begin, at 902, by detecting initiation of a MO call.

At 904, the UE may attempt to establish a connection (e.g., RRC connection) with the first RAT prior to sending a SIP message for the MO call. According to certain aspects, the IMS layer (e.g., IMS client 501) may send a request to a LTE layer (e.g., LTE stack 503) to establish a RRC connection between the UE and the first packet-based RAT. According to certain aspects, the UE may first create a packet having an SIP:INVITE message in the IMS layer, but refrain from sending the packet to the LTE layer until after the RRC connection is established.

At 906, the UE may determine whether the connection is successfully established. For example, after a certain period of time (e.g., where a confirmation of the connection is not received) it may be determined that the connection was not successful. According to certain aspects, an error message from the network may be received. According to certain aspects, if the connection is not successfully established before a time period, the UE may take steps to establish the MO call over the second RAT. For example, the UE may delete the SIP message (e.g., packet including SIP:INVITE), and/or attempt a silent redial on the 1× network. According to certain aspects, the UE may start a timer when the attempting to establish a connection with the first packet-based RAT begins and the UE may determine that the attempt to establish a connection is unsuccessful if a confirmation is not received before expiry of the timer (e.g., 5-20 seconds).

At 908, if the connection is successfully established, the UE may send the SIP message.

Network-Based and Mobile Terminated (MT) UE-Based Solutions

Figure 10:
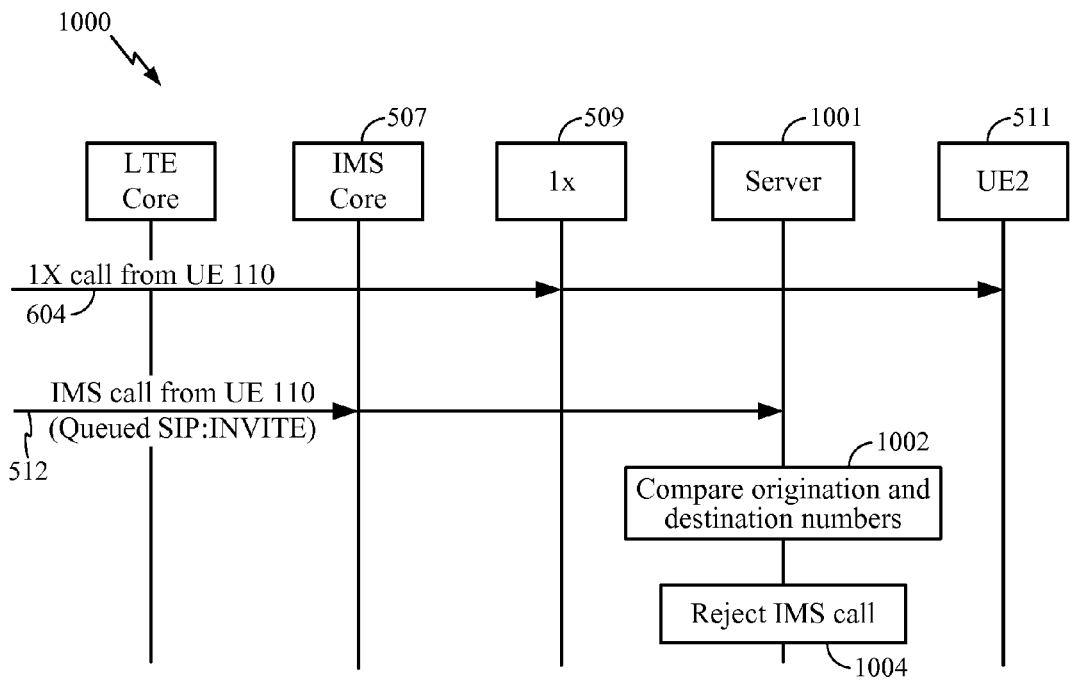
FIGS. 10-13 illustrate example call flows for receiving the 1× and LTE call between the same users of FIG. 6, in accordance with certain aspects of the present disclosure.

According to certain aspects, a network-based solution may be used. FIG. 10 illustrates an example call flow 1000 for receiving the 1× and LTE call between the same users of FIG. 6, in accordance with certain aspects of the present disclosure.

As shown in FIG. 6, an MO call may be placed from the SV-LTE UE 110 to the far-end user 511 using VoLTE. However, the VoLTE call may fail to connect, and silent redial may be performed over 1×. Although not shown in FIG. 6 or 10, in another example, an LTE call may be placed and subsequently fail, and may perform CSFB over 1× (e.g., the UE may move out of LTE coverage). In both cases, the UE 110 may establish a circuit-switched call, for example over 1×. As shown in FIG. 10, at 604, the 1× call may be successfully placed, thus becoming an active call.

According to certain aspects, when the call is established between the UE and the far-end UE over the 1× network, the call may be anchored at a server 1001. For network-based solutions, the server 1001 may be a network server such as a voice call continuity application server (VCC-AS). For MT UE-based solution, the server 1001 may be a server of the far-end user 511, such as a multimedia communication server (MCS) server or proxy call session control function (P-CSCF) server of the far-end user 511.

A VCC-AS may assist in terminating services to a terminal that is 1× CS registered and/or IMS registered and is involved in voice call setup signaling to facilitate VoIP-to-1× CS voice call. The VCC-AS may be anchored in the call signaling path of voice calls originated from, or terminated to, a VCC UE that is IMS or 1× registered. Because the VCC-AS may be used as a common anchor for the LTE call and the subsequent 1× redial, the VCC-AS may be aware of both calls.

Figure 13:
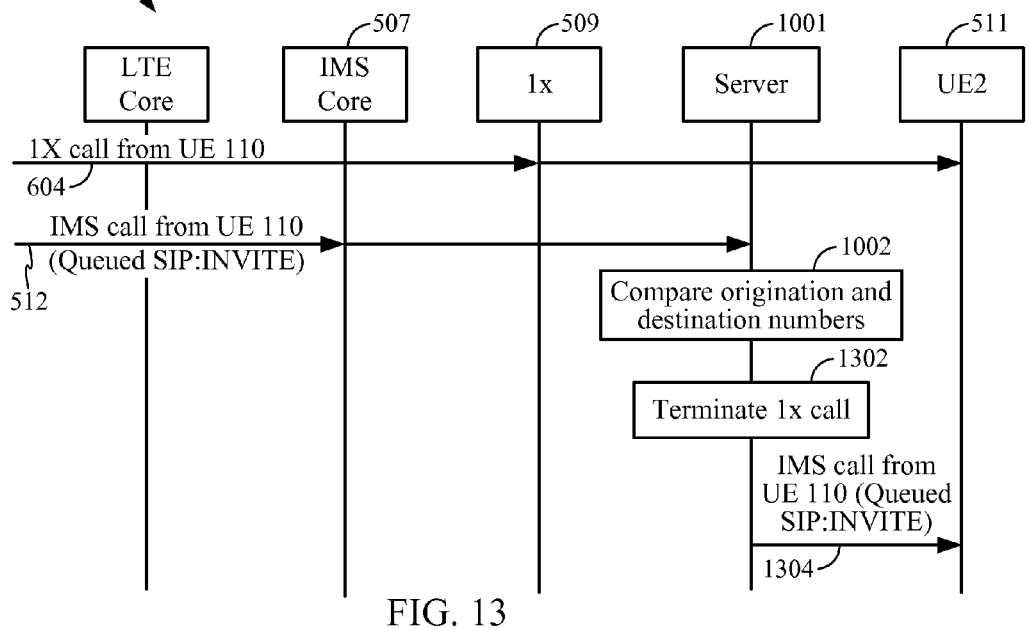

According to certain aspects, as shown in FIG. 10, after the 1× call is established with the far-end user 511 at 604, a SIP message (e.g., SIP:INVITE) may subsequently reach the server 1001 (e.g., VCC-AS, MCS, P-CSCF). According to certain aspects, the SIP:INVITE and 1× call may include headers which provide an address number of the originating call which identify the UE making the call and/or may include destination address number. The server 1001 may detect that there is an existing call (e.g., the active 1× call) between the UE 110 and the far-end user 511. For example, at 1002, the server 1001 may compare origination and destination numbers of the calls and determine that the origination and destination numbers are the same (e.g., between the UE 110 and far-end user 511). The server may not know which call is the real call, and which call is the spurious call. According to certain aspects, at 1004, the server 1001 and may not forward the SIP message (e.g., assume the second call is spurious and therefore, drop the incoming IMS call). Alternatively, as shown in FIG. 13, at 1302, the server 1001 may terminate the active call (e.g., assume the first call is spurious and therefore, drop the active 1× call) and, at 1304, forward the SIP message to the far-end user 511 (e.g., forward the incoming IMS call).

Figure 11:
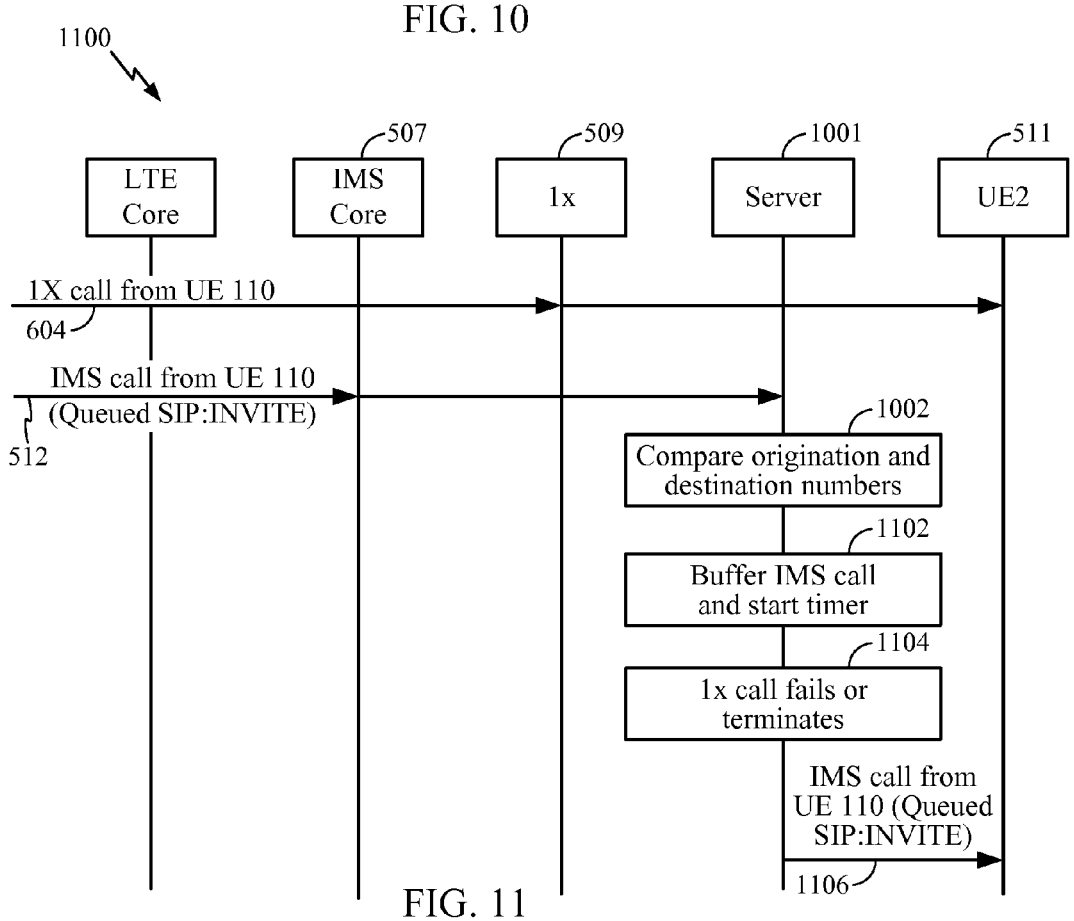
Figure 12:
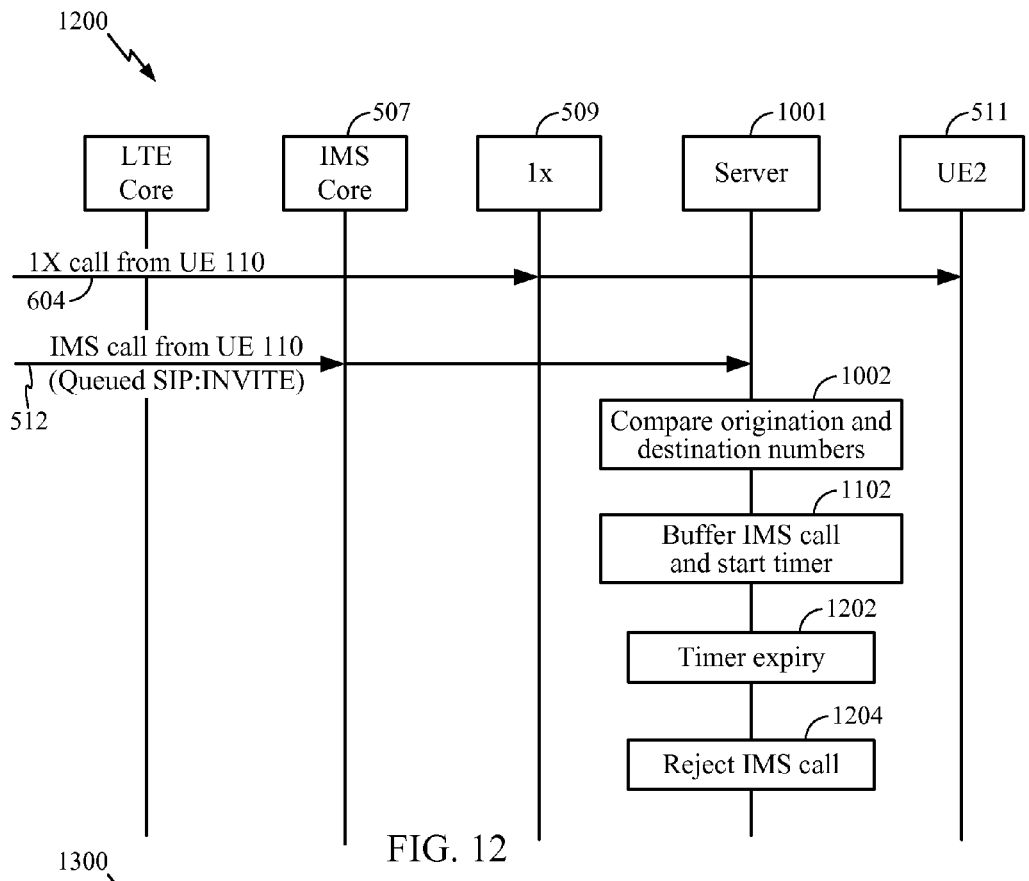

According to certain aspects, the server 1001 may be aware that an active calls exits between the users. In this case, the server 1001 may determine whether to drop the active call and forward the incoming call or drop the incoming call. As shown in FIG. 11, an active 1× call may be established with the far-end user at 604. At 512, the server 1001 may detect the incoming IMS call. At 1002, the server 1001 may determine that both calls are between the same users, for example, by comparing the origination and destination numbers included in the calls. At 1102, the server 1001 may buffer the IMS call and start a timer. The timer may be set to expire after a certain duration (e.g., 5-20 seconds). As shown in FIG. 11, at 1104, the active 1× call may fail or end before expiration of the timer and, in this case, at 1006, the server 1001 may forward the buffered IMS call to the far-end user 511 (e.g., sends the packet including the SIP:INVITE). Alternatively, as shown in FIG. 12, the 1× call may remain active until expiry of the timer at 1202. In this case, at 1204, the server 1001 may reject the IMS call (e.g., by deleting the packet including the SIP:INVITE from the buffer).

As mentioned above, the server 1001 may be VCC-AS of the network or a P-CSCF or MCS of the far-end user 511. According to certain embodiments, if the far-end user 511 is on an LTE network, the call may reach the terminating UEs P-CSCF or MCS. In this case, the P-CSCF or MCS may perform the functions of the server 1001. For example, the MT UE may avoid impact to user experience by comparing the originating and destination numbers in the two calls. If the originating numbers match and destination numbers match, the call waiting call may be rejected without displaying it to the user. For example, a 4xx (e.g., 488) client error message may be sent in response to the SIP:INVITE if the UE is on LTE, or a call release message may be sent if the far-end UE is on 1×. Alternatively, if the originating numbers do not match and/or the destination numbers do not match, the call may be forwarded (e.g., a 200 OK message may be sent in response to SIP:INVITE).

Figure 14:
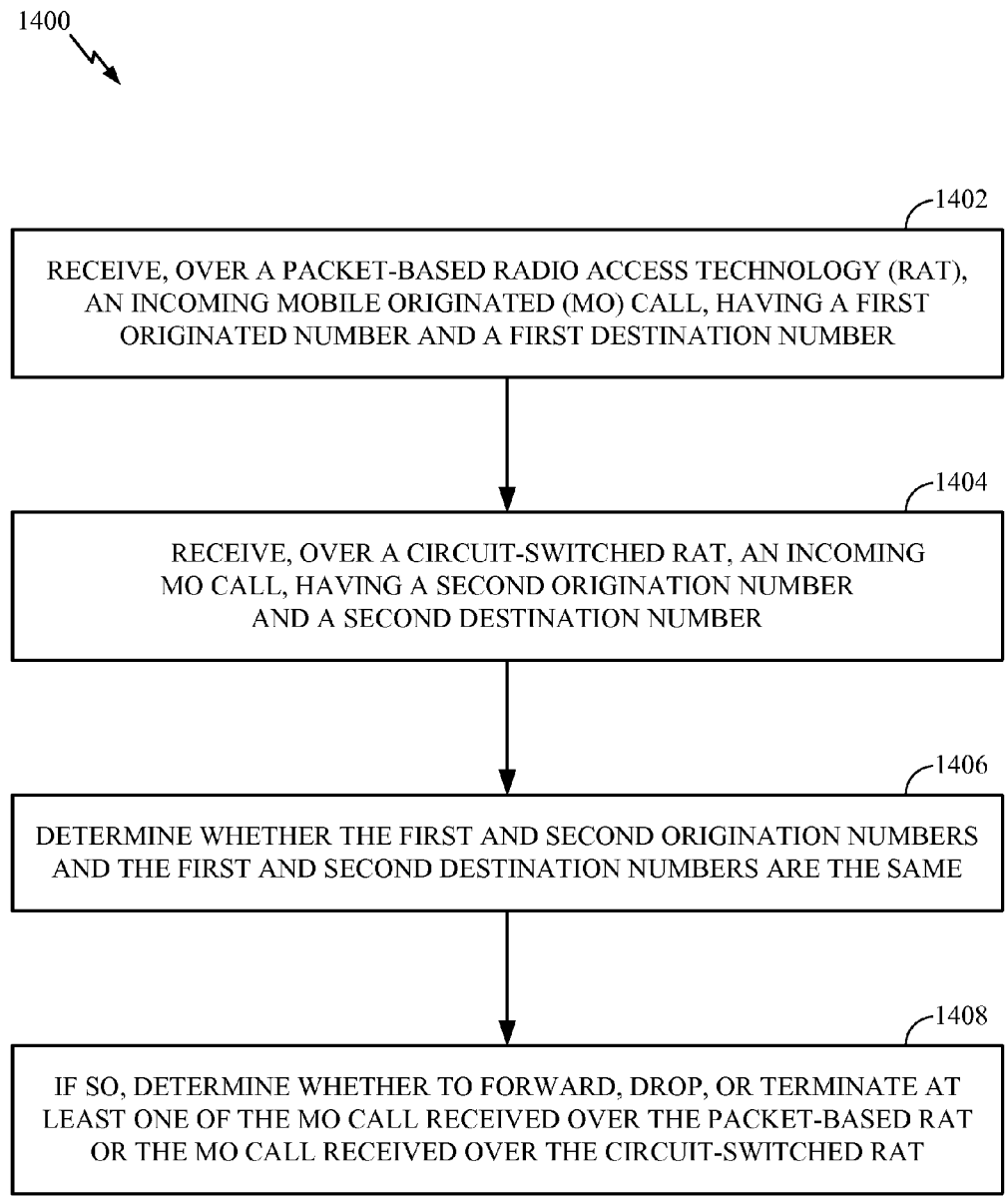
FIG. 14 illustrates example operations for wireless communications, in accordance with certain aspects of the present disclosure.

FIG. 14 illustrates example operations 1400 for wireless communications, in accordance with certain aspects of the present disclosure. The operations 1400 may be performed, for example, by a server of a network (e.g., VCC-AS) or a far-end UE interface (e.g., MCS or P-CSCF). The operations 1400 may begin, at 1402, by receiving, over a packet-based RAT (e.g., LTE), an incoming MO call, having a first origination number and a first destination number. For example, a packet including an SIP message (e.g., a packet including SIP:INVITE) may be received over LTE. The origination number and destination number may be included in a header of the packet.

At 1404, an incoming MO call having a second origination number and a second destination number may be received over a circuit-switched RAT (e.g., CDMA 1×).

At 1406, a determination may be made whether the first and second origination numbers and the first and second destination numbers are same. For example, by comparing the first origination and first destination number with the second origination number and the second destination number and determining whether the first and second origination numbers are the same, and the first and second destination numbers are the same.

At 1408, if the first and second origination numbers and the first and second destination numbers are the same, a determination may be made whether to forward, drop, or terminate at least one of the MO call received over the packet-based RAT or the MO call received over the circuit-switched RAT. For example, the second call may be dropped. Alternatively, the first call may be terminated, and the second call may be forwarded. Another alternative includes buffering the second call, starting a timer (e.g., between 5-20 seconds), and determining whether the first call remains active at the end of the timer and if so, dropping the second call, otherwise terminating the first call and forwarding the second call. The first call may be the MO call received over the packet-based RAT and the second call may be the MO call received over the circuit-switched RAT. Alternatively, the first call may be the MO call received over the circuit-switched RAT and the second call may be the MO call received over the packet-based RAT.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Figure 9A:
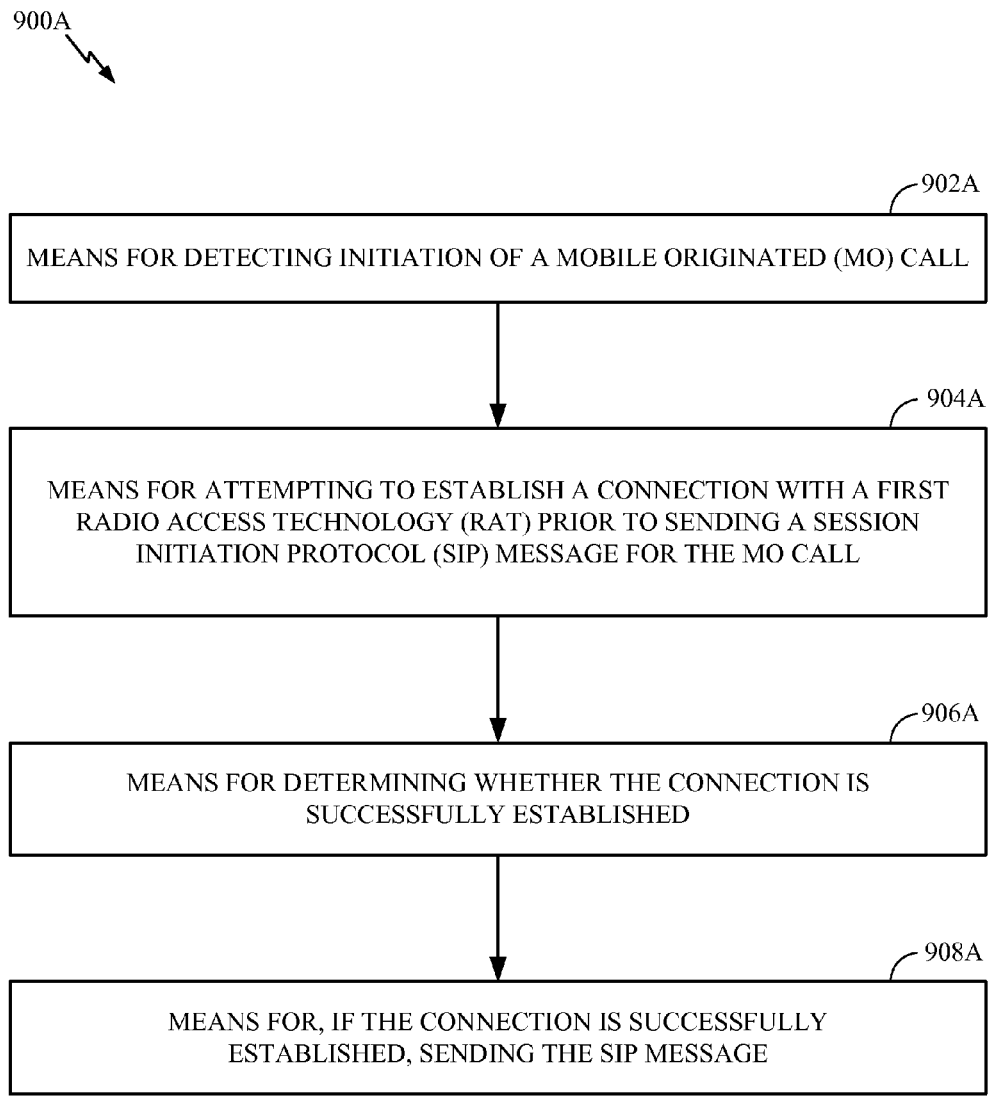
FIG. 9A illustrates example means capable of performing the operations shown in FIG. 9, in accordance with certain aspects of the present disclosure.
Figure 14A:
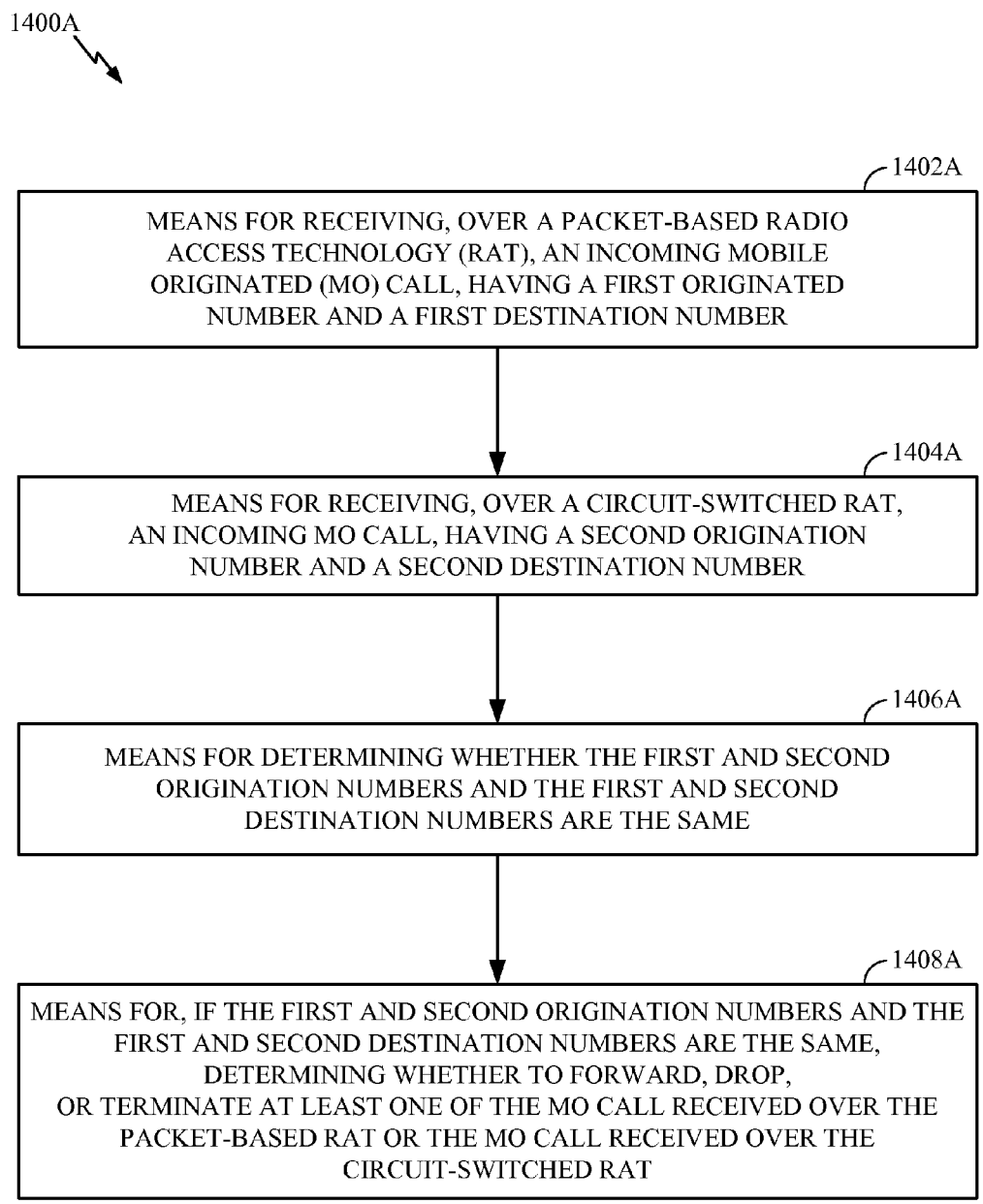
FIG. 14A illustrates example means capable of performing the operations shown in FIG. 14, in accordance with certain aspects of the present disclosure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900 and 1400 illustrated in FIGS. 9 and 14, respectively, correspond to means 900A and 1400A illustrated in FIGS. 9A and 14A, respectively.

For example, means for transmitting may comprise a transmitter 222 and/or an antenna(s) 224 of the UE 110 or far-end user 511 and a transceiver 238 or antenna(s) 236 of eNB 122. Means for receiving may comprise a receiver 226 and/or an antenna(s) 224 of the UE 110 or far-end user 511 and transceiver 238 and/or antenna(s) 236 of eNB 122. Means for determining may comprise a processing system, which may include one or more processors, such as modem processor 210 of the UE 110 or controller/processor 240 of eNB 122, for example.

According to certain aspects, such means may be implemented by processing systems configured to perform the corresponding functions by implementing various algorithms (e.g., in hardware or by executing software instructions). For example, algorithms include an algorithm for detecting initiation of a MO call, an algorithm for attempting to establish a connection with the first RAT prior to sending a SIP message for the MO call, an algorithm for determining whether the connection is successfully established, and/or an algorithm for, if the connection is successfully established, sending the SIP message. In aspects, algorithms include an algorithm for receiving, over a packet-based RAT, an incoming MO call, having a first origination number and a first destination number, an algorithm for receiving, over a circuit-switched RAT, an incoming MO call, having a second origination number and a second destination number, an algorithm for determining whether the first and second origination numbers and the first and second destination numbers are the same, and/or an algorithm for, if the first and second origination numbers and the first and second destination numbers are same, determining whether to forward, drop, or terminate at least one of the MO call received over the packet-based RAT or the MO call received over the circuit-switched RAT.

The various algorithms may implemented by a computer-readable medium that may be a non-transitory computer-readable medium. The computer-readable medium may have computer executable instructions (e.g., code) stored thereon. For example, the instructions may be executed by a processor or processing, such as modem processor 210 of the UE 110 or processor 240 of eNB 122, and stored in a memory, such as memory 232 of the UE 110 or memory 242 of eNB 122. For example, the computer-readable medium may have computer executable instructions stored thereon for detecting initiation of a MO call, instructions for attempting to establish a connection with the first RAT prior to sending a SIP message for the MO call, instructions for determining whether the connection is successfully established, and/or instructions for, if the connection is successfully established, sending the SIP message. In aspects, the computer-readable medium may have computer executable instructions stored thereon for receiving, over a packet-based RAT, an incoming MO call, having a first origination number and a first destination number, instructions for receiving, over a circuit-switched RAT, an incoming MO call, having a second origination number and a second destination number, instructions for determining whether the first and second origination numbers and the first and second destination numbers are same, and/or instructions for, if the first and second origination numbers and the first and second destination numbers are same, determining whether to forward, drop, or terminate at least one of the MO call received over the packet-based RAT or the MO call received over the circuit-switched RAT.

As used herein, a phrase referring to "at least one of" a list of items refers to any combination of those items, including single members. As an example, "at least one of: a, b, or c" is intended to cover: a, b, c, a-b, a-c, b-c, and a-b-c.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a user equipment (UE) capable of communicating via a first packet-based radio access technology (RAT) and a second circuit-switched RAT, the method comprising:
   detecting initiation of a mobile originated (MO) call;
   generating a session initiation protocol (SIP) message for the MO call;
   attempting to establish a connection with the first RAT prior to queuing the SIP message for sending;
   determining whether the connection is successfully established; and
   if the connection is successfully established, sending the SIP message.

2. The method of claim 1, wherein the first packet-based RAT comprises a Long Term Evolution (LTE) RAT network and the second circuit-switched RAT comprises a code division multiple access (CDMA) 1×RAT network.

3. The method of claim 1, further comprising,
   if the connection is not successfully established before a time period, taking steps to establish the MO call over the second circuit-switched RAT.

4. The method of claim 3, further comprising deleting the SIP message.

5. The method of claim 1, wherein attempting to establish a connection with the first RAT comprises an internet protocol multimedia subsystem (IMS) layer sending a request to a LTE layer to establish a radio resource control (RRC) connection between the UE and the first packet-based RAT.

6. The method of claim 1, wherein the connection is a radio resource control (RRC) connection.

7. The method of claim 1, wherein determining whether a connection has been successfully established comprises at least one of receiving an error message indicating that the connection cannot be established or determining a timer has expired.

8. The method of claim 1, further comprising:
   starting a timer when the attempting to establish a connection with the first packet-based RAT begins, wherein
   determining whether the connection is successfully established comprises determining that the attempt is unsuccessful if a confirmation message is not received before expiry of the timer.

9. The method of claim 8, wherein the timer is for between 5 seconds and 20 seconds.

10. An apparatus for wireless communications, comprising:
    means for detecting initiation of a mobile originated (MO) call;
    means for generating a session initiation protocol (SIP) message for the MO call;
    means for attempting to establish a connection with the first radio access technology (RAT) prior to queuing the SIP message for sending;
    means for determining whether the connection is successfully established; and
    means for, if the connection is successfully established, sending the SIP message.

11. The apparatus of claim 10, further comprising,
    means for, if the connection is not successfully established before a time period, taking steps to establish the MO call over a second RAT.

12. The apparatus of claim 11, further comprising means for deleting the SIP message.

13. The apparatus of claim 10, wherein means for determining whether a connection has been successfully established comprises at least one of means for receiving an error message indicating that the connection cannot be established or means for determining a timer has expired.

14. The apparatus of claim 10, further comprising:
    means for starting a timer when the attempting to establish a connection with the first packet-based RAT begins, wherein means for determining whether the connection is successfully established comprises means for determining that the attempt is unsuccessful if a confirmation message is not received before expiry of the timer.

15. An apparatus for wireless communications, comprising:
at least one processor configured to:
detect initiation of a mobile originated (MO) call;
generate a session initiation protocol (SIP) message for the MO call;
attempt to establish a connection with the first RAT prior to queuing the SIP message for sending;
determine whether the connection is successfully established; and
send the SIP message if the connection is successfully established; and
a memory coupled with the at least one processor.

16. The apparatus of claim 15, wherein the first packet-based RAT comprises a Long Term Evolution (LTE) RAT network and the second circuit-switched RAT comprises a code division multiple access (CDMA) 1×RAT network.

17. The apparatus of claim 15, wherein the at least one processor is further configured to take steps to establish the MO call over the second circuit-switched RAT if the connection is not successfully established before a time period.

18. The apparatus of claim 17, wherein the at least one processor is further configured to delete the SIP message.

19. The apparatus of claim 15, wherein the at least one processor is further configured to send, by an internet protocol multimedia subsystem (IMS) layer, a request to a LTE layer to establish a radio resource control (RRC) connection between the apparatus and the first RAT.

20. The apparatus of claim 15, wherein the connection is a radio resource control (RRC) connection.

21. The apparatus of claim 15, wherein the at least one processor is further configured to at least one of receive an error message indicating that the connection cannot be established or determine a timer has expired.

22. The apparatus of claim 15, wherein:
the at least one processor is further configured to start a timer when the attempting to establish a connection with the first RAT begins; and
determine that the attempt is unsuccessful if a confirmation message is not received before expiry of the timer.

23. The apparatus of claim 22, wherein the timer is for between 5 seconds and 20 seconds.

24. A non-transitory computer readable medium having computer executable code stored thereon, the computer executable code comprising:
code for detecting initiation of a mobile originated (MO) call;
code for generating a session initiation protocol (SIP) message for the MO call;
code for attempting to establish a connection with the first radio access technology (RAT) prior to queuing the SIP message for sending;
code for determining whether the connection is successfully established; and
code for sending the SIP message if the connection is successfully established.

25. The non-transitory computer readable medium of claim 24, further comprising,
code for, if the connection is not successfully established before a time period, taking steps to establish the MO call over a second RAT.

26. The non-transitory computer readable medium of claim 24, further comprising code for deleting the SIP message.

27. The non-transitory computer readable medium of claim 24, wherein code for determining whether a connection has been successfully established comprises at least one of code for receiving an error message indicating that the connection cannot be established or code for determining a timer has expired.

28. The non-transitory computer readable medium of claim 24, further comprising:
code for starting a timer when the attempting to establish a connection with the first packet-based RAT begins, wherein the code for determining whether the connection is successfully established comprises code for determining that the attempt is unsuccessful if a confirmation message is not received before expiry of the timer.

* * * * *